US008490010B2

(12) United States Patent
Stienhans

(10) Patent No.: US 8,490,010 B2
(45) Date of Patent: Jul. 16, 2013

(54) SELECTIVE DISPLAY OF GRAPHICAL USER INTERFACE ELEMENTS

(75) Inventor: Frank Stienhans, Mannheim (DE)

(73) Assignee: SAP AG, Walldorf (DE)

( * ) Notice: Subject to any disclaimer, the term of this patent is extended or adjusted under 35 U.S.C. 154(b) by 478 days.

(21) Appl. No.: 11/300,829

(22) Filed: Dec. 14, 2005

(65) Prior Publication Data

US 2007/0136682 A1     Jun. 14, 2007

(51) Int. Cl.
*G06F 3/048* (2006.01)

(52) U.S. Cl.
USPC ........... 715/789; 715/780; 715/221; 715/224; 715/225; 705/14

(58) Field of Classification Search
USPC ................. 715/507, 508, 509, 530, 789, 780, 715/843, 844, 224–225, 227, 25
See application file for complete search history.

(56) References Cited

U.S. PATENT DOCUMENTS

| | | | | |
|---|---|---|---|---|
| 5,666,502 A * | 9/1997 | Capps | | 715/811 |
| 5,805,911 A * | 9/1998 | Miller | | 715/234 |
| 6,199,079 B1 * | 3/2001 | Gupta et al. | | 715/207 |
| 6,232,972 B1 * | 5/2001 | Arcuri et al. | | 715/815 |
| 6,662,340 B2 * | 12/2003 | Rawat et al. | | 715/236 |
| 7,181,696 B2 * | 2/2007 | Brock | | 715/758 |
| 7,216,292 B1 * | 5/2007 | Snapper et al. | | 715/236 |
| 7,254,569 B2 * | 8/2007 | Goodman et al. | | 707/1 |
| 7,278,113 B1 * | 10/2007 | Racine et al. | | 715/780 |
| 2001/0017632 A1 | 8/2001 | Goren-Bar | | |
| 2002/0013788 A1 * | 1/2002 | Pennell et al. | | 707/507 |
| 2002/0022962 A1 * | 2/2002 | Richardson | | 705/1 |
| 2002/0156846 A1 * | 10/2002 | Rawat et al. | | 709/203 |
| 2002/0186255 A1 * | 12/2002 | Shafron et al. | | 345/810 |
| 2003/0023641 A1 * | 1/2003 | Gorman et al. | | 707/530 |
| 2004/0049729 A1 * | 3/2004 | Penfield | | 715/503 |
| 2004/0119745 A1 * | 6/2004 | Bartek et al. | | 345/763 |
| 2004/0122717 A1 * | 6/2004 | Hancock | | 705/4 |
| 2004/0153509 A1 * | 8/2004 | Alcorn et al. | | 709/205 |
| 2004/0189708 A1 * | 9/2004 | Larcheveque et al. | | 345/780 |
| 2004/0255240 A1 * | 12/2004 | Udom et al. | | 715/506 |
| 2005/0005234 A1 * | 1/2005 | Chen | | 715/508 |
| 2005/0021286 A1 * | 1/2005 | Kunce | | 702/179 |
| 2005/0257134 A1 * | 11/2005 | Goodman et al. | | 715/507 |
| 2006/0059434 A1 * | 3/2006 | Boss et al. | | 715/780 |
| 2006/0085251 A1 * | 4/2006 | Greene | | 705/14 |
| 2006/0085280 A1 * | 4/2006 | Murnan et al. | | 705/26 |
| 2006/0150077 A1 * | 7/2006 | Sheldon et al. | | 715/509 |
| 2006/0178925 A1 * | 8/2006 | Meece et al. | | 705/9 |
| 2007/0005449 A1 * | 1/2007 | Mathew et al. | | 705/27 |
| 2008/0052639 A1 * | 2/2008 | Chun et al. | | 715/810 |
| 2008/0172598 A1 * | 7/2008 | Jacobsen et al. | | 715/224 |

OTHER PUBLICATIONS

SAP; SAP Netweaver Visual Composer User Guide; Copy Right 2004; version 1.1; 208 pages.*

(Continued)

*Primary Examiner* — Doon Chow
*Assistant Examiner* — Linh K Pham
(74) *Attorney, Agent, or Firm* — Fountainhead Law Group PC

(57) ABSTRACT

A subset of a plurality of input elements associated with a form to be rendered in a graphical user interface may be identified. Thereafter, the rendering of the form may be initiated such that the graphical user interface renders a form to include the subset of the plurality of input elements and to exclude input elements that are not within the subset. Related techniques, apparatuses, systems, and computer program products are also described.

19 Claims, 6 Drawing Sheets

OTHER PUBLICATIONS

Simon Lok et al., "A Survey of Automated Layout Techniques for Information Presentations," Dept. of Computer Science, Columbia University. [online], [retrieved on Dec. 13, 2005]. Retrieved from the Internet: <URL: http://www1.cs.columbia.edu/graphics/publications/layoutsurvey.pdf>.

Grace de la Flor, "User Modeling & Adaptive User Interfaces," ILRT Research Report No. 1085, Jul. 5, 2004. [retrieved on Dec. 13, 2005]. Retrieved from the Internet: <URL: http://www.ilrt.bris.ac.uk/publications/researchreport/rr1085/report_html?ilrtyear=2004>.

* cited by examiner

About You

All applicable fields are required.

- Salutation:
- First name:
- Last name:
- Company:
- Address line 1:
- Address line 2: (if applicable)
- City:
- Country/Region: Please select...
- State/province/territory: (if applicable)
- Postal code: (if applicable)
- Phone:
- Relationship to COMPANY:
- Position:
- Industry: Please select...
- E-mail:

⎬ 510

Topic

- Topic area:
- ☐ Please have a COMPANY sales representative contact me directly.
- ☐ Please send me COMPANY-related news.

⎬ 520

Message

- Message subject:
- Message: (Questions, comments, concerns)

[Send] [Cancel]

SELECTIVE DISPLAY OF GRAPHICAL USER INTERFACE ELEMENTS

TECHNICAL FIELD

The subject matter described herein relates to the selective display of graphical user interface elements.

BACKGROUND

Applications are increasingly providing complex graphical user interfaces to obtain information from a user. With such applications, a large number of graphical user interface elements may be simultaneously displayed even if they are not required for a particular task. Such an inclusion of non-essential input elements within the graphical user interface may result in decreased usability and/or increase an amount of time required to provide requested information.

SUMMARY

In one aspect, a subset of a plurality of graphical user interface elements (e.g., input elements such as buttons, input fields, tab strips, drop down menus, link lists, etc.) associated with a form to be rendered in a graphical user interface may be identified. Thereafter, the rendering of the form in the graphical user interface may be initiated so that the form includes the subset of the plurality of graphical user interface elements and excludes input elements that are not within the subset. The initiation may comprise locally rendering the form or transmitting data to a remote client via a communications network so that the form may be rendered at the local client.

In some variations, the plurality of input elements may be ranked based on frequency of use, most recent use, predicted frequency of use, and the like so that the identification may be based on the ranking of the plurality of input elements. These rankings and/or other usage statistics may be determined, at least in part, by monitoring previous uses of the form and storing relevant data within a data repository. In addition, in some variations, a plurality of forms may be stored in the data repository such that a particular form is selected based on the usage statistics.

The usage statistics may form the basis of an alteration of the form. For example, a physical layout of at least one of the subset of the plurality of input elements may be modified in order to optimize entry by a user. In some variations, at least one of the subset of the plurality of elements may be populated with a pre-determined value.

In an interrelated aspect, a subset of a plurality of input elements associated with a form to be rendered in a graphical user interface based on usage statistics for the form may be automatically identified. Subsequently, the rendering of the form in the graphical user interface may be initiated so that the form populates only the subset of the plurality of input elements with predetermined values.

In still another interrelated aspect, a rendering of a form in a graphical user interface in a first state having a plurality of input elements may be initiated. Thereafter, the rendering of the form in the graphical user interface in a second state may be initiated so that it includes at least a portion of the plurality of input elements and an appearance of at least one of the input elements is modified relative to the first state based on usage statistics for the form.

In a further aspect, an apparatus may comprise an input processor, an output processor, and an engine. The input processor may receive messages and other data from a plurality of clients via a communications network, and in some variations, with a data repository (which may be directly coupled to the apparatus or accessible via the communications network). The output processor may transmit data to the plurality of clients and/or poll the data repository to obtain and/or store information relating to usage statistics for a form (or a set of forms).

The engine, in some variations, may be operable to identify a subset of a plurality of input elements associated with a form to be rendered in a graphical user interface (which may reside in the engine or at one or more of the clients), and initiate a rendering of the form in the graphical user interface to include the subset of the plurality of input elements and to exclude input elements that are not within the subset. In other variations, the engine may be operable to identify a subset of a plurality of input elements associated with a form to be rendered in a graphical user interface based on usage statistics for the form, and to additionally initiate a rendering of the form in the graphical user interface to populate only the subset of the plurality of input elements with predetermined values. In still a further variation, the engine may be operable to initiate a rendering of a form in a graphical user interface in a first state having a plurality of input elements, and initiate a rendering of the form in the graphical user interface in a second state including at least a portion of the plurality of input elements such that an appearance of at least one of the input elements is modified relative to the first state based on usage statistics for the form.

Computer program products, tangibly embodied on computer-readable media are also described. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

The subject matter described herein provides many advantages. For example, forms that have been modified according to either historical usage statistics or predicted historical usage statistics allow for more efficient user interaction.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 illustrates a form in a first state comprising a plurality of input elements;

FIG. 6 illustrates a form in a second state comprising a plurality of input elements; and FIG. 7 illustrates a form in a third state comprising a plurality of input elements.

DETAILED DESCRIPTION

Figure 1:
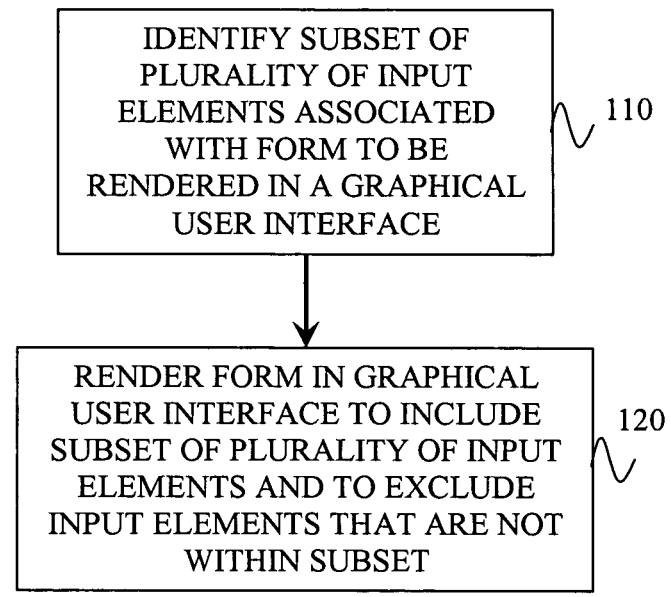
FIG. 1 is a process flow diagram illustrating a first method of initiating the rendering of a form comprising a plurality of input elements.

FIG. 1 is a process flow diagram of a method 100 in which, at 110, a subset of a plurality of input elements associated with a form to be rendered in a graphical user interface are identified. Thereafter, at 120, the rendering of a form is initiated such that the form may be rendered in the graphical user interface so that it includes the subset of the plurality of input elements and excludes input elements that are not within the subset.

Figure 2:
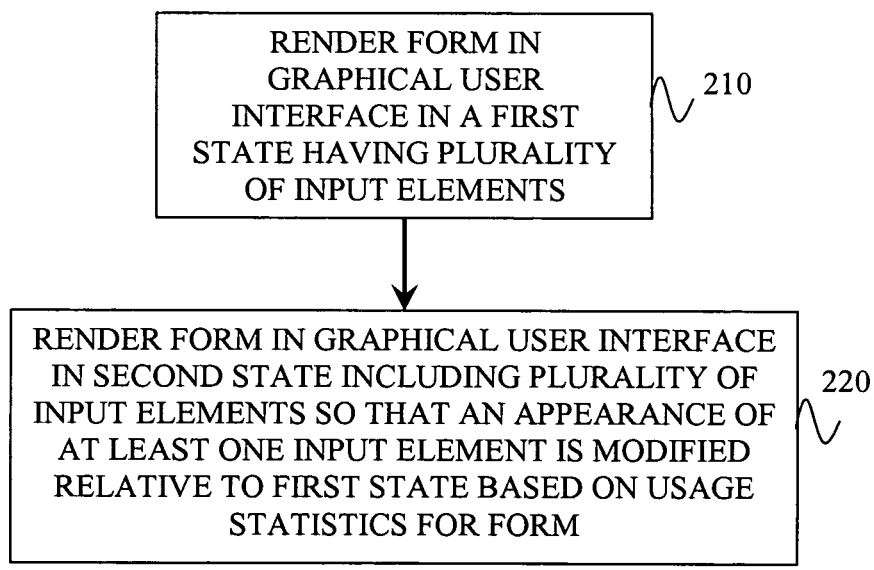
FIG. 2 is a process flow diagram illustrating a second method of initiating the rendering of a form comprising a plurality of input elements.

FIG. 2 is a process flow diagram of a method 200 (that is interrelated to the method 100 of FIG. 1), in which, at 210, the rendering of a form is initiated so that the form is rendered in a graphical user interface in a first state having a plurality of input elements. Subsequently, at 220, the form is rendered in the graphical user interface in a second state including at least a portion of the plurality of input elements. In addition, with this arrangement, an appearance of at least one of the input elements is modified relative to the first state based on usage statistics for the form.

Figure 3:
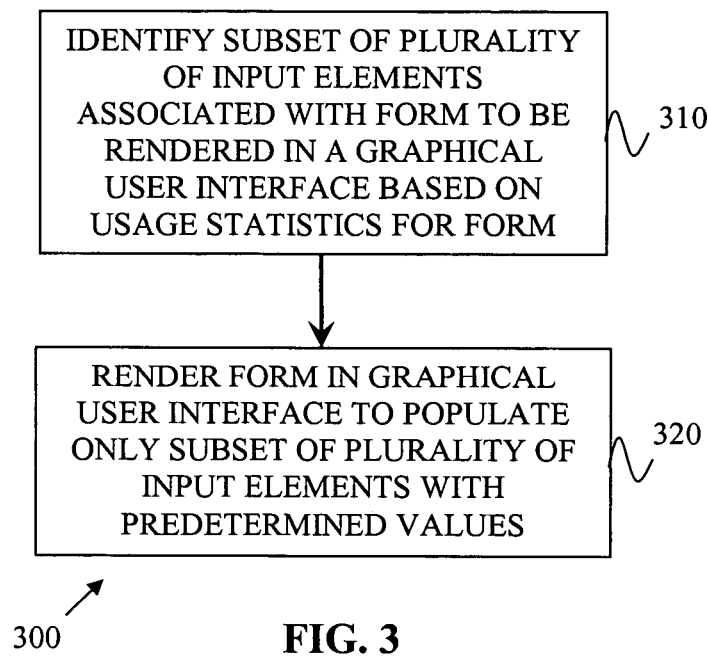
FIG. 3 is a process flow diagram illustrating a third method of initiating the rendering of a form comprising a plurality of input elements.

FIG. 3 is a process flow diagram of a method 300 (that is interrelated to method 100 illustrated in FIG. 1 and method 200 illustrated in FIG. 2), in which, at 310, a subset of a plurality of input elements associated with a form to be rendered in a graphical user interface are identified based on usage statistics for the form. Thereafter, at 320, the rendering of a form may be initiated so that the graphical user interface renders a form that populates only the subset of the plurality of input elements with predetermined values.

Figure 4:
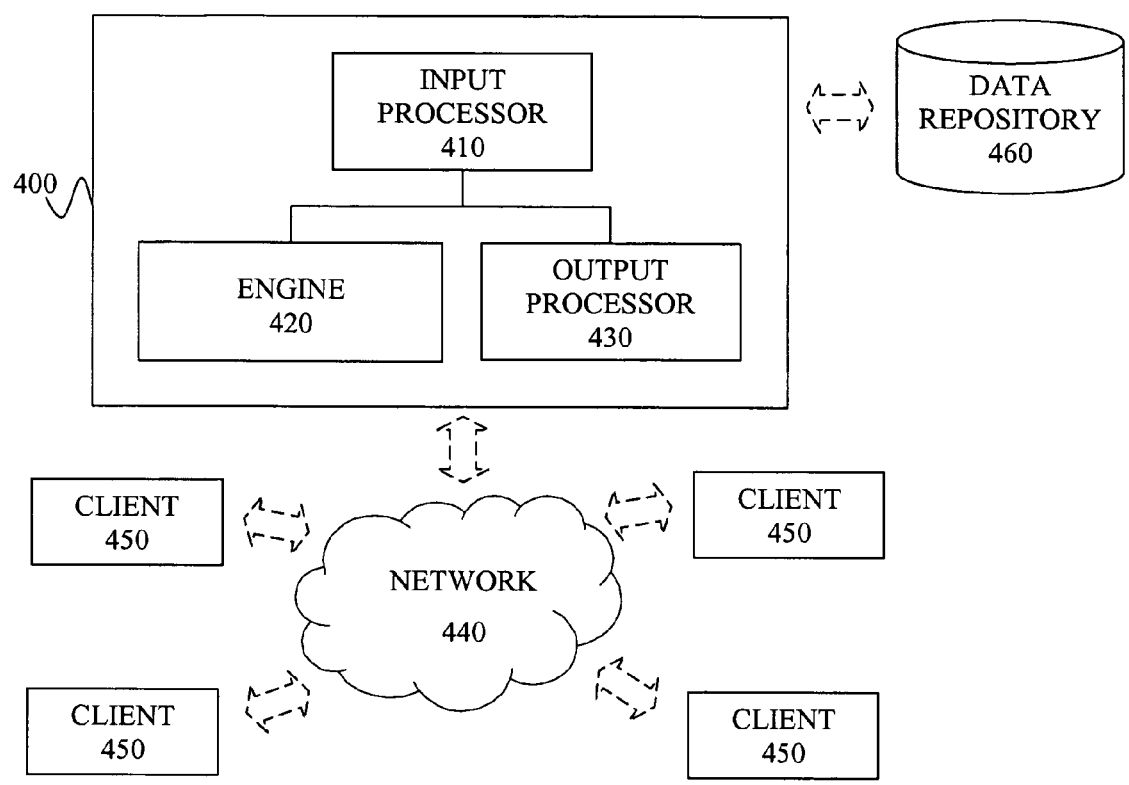
FIG. 4 is a schematic diagram of an apparatus operable to initiate the rendering of a form comprising a plurality of input elements.

FIG. 4 illustrates an apparatus 400 comprising an input processor 410, an engine 420, and an output processor 430. The apparatus 400 may be coupled to a plurality of clients 450 via a communications network 440 such as the Internet. In some variations, the apparatus 400 may be coupled to or include a data repository 460.

The input processor 410 is operable to receive form generation requests from the plurality of clients and/or to receive data from the data repository. The engine 420 is operable to determine a subset of input elements to be used when rendering a form and/or in what fashion input elements on a form are to be positioned. In some variations, the engine 420 utilizes usage statistics in order to determine which input elements and/or how to arrange input elements. The engine 420 is also operable to generate data to render a form with the input elements/layout as determined. The output processor 430 is operable to transmit the data to render the form to a requesting client 450 which may in turn may render the form, using, for example, a web browser or similar graphical user interface. The data repository 460 is operable to house information such as usage statistics associated with a form to be rendered, and/or information relating to the various input elements to be used in rendering a form.

FIG. 5 illustrates a form 500 in which additional information regarding a user is sought. The information may be used, for example, to generate a sales lead or for other customer relationship purposes. The form 500 includes three sections of input elements, a first section 510 in which input elements relating to contact information for a user are displayed, a second section 520 in which input elements categorizing a topic for contacting a company are displayed, and a third section 530 in which input elements prompting a user to enter a detailed message are displayed.

Figure 6:
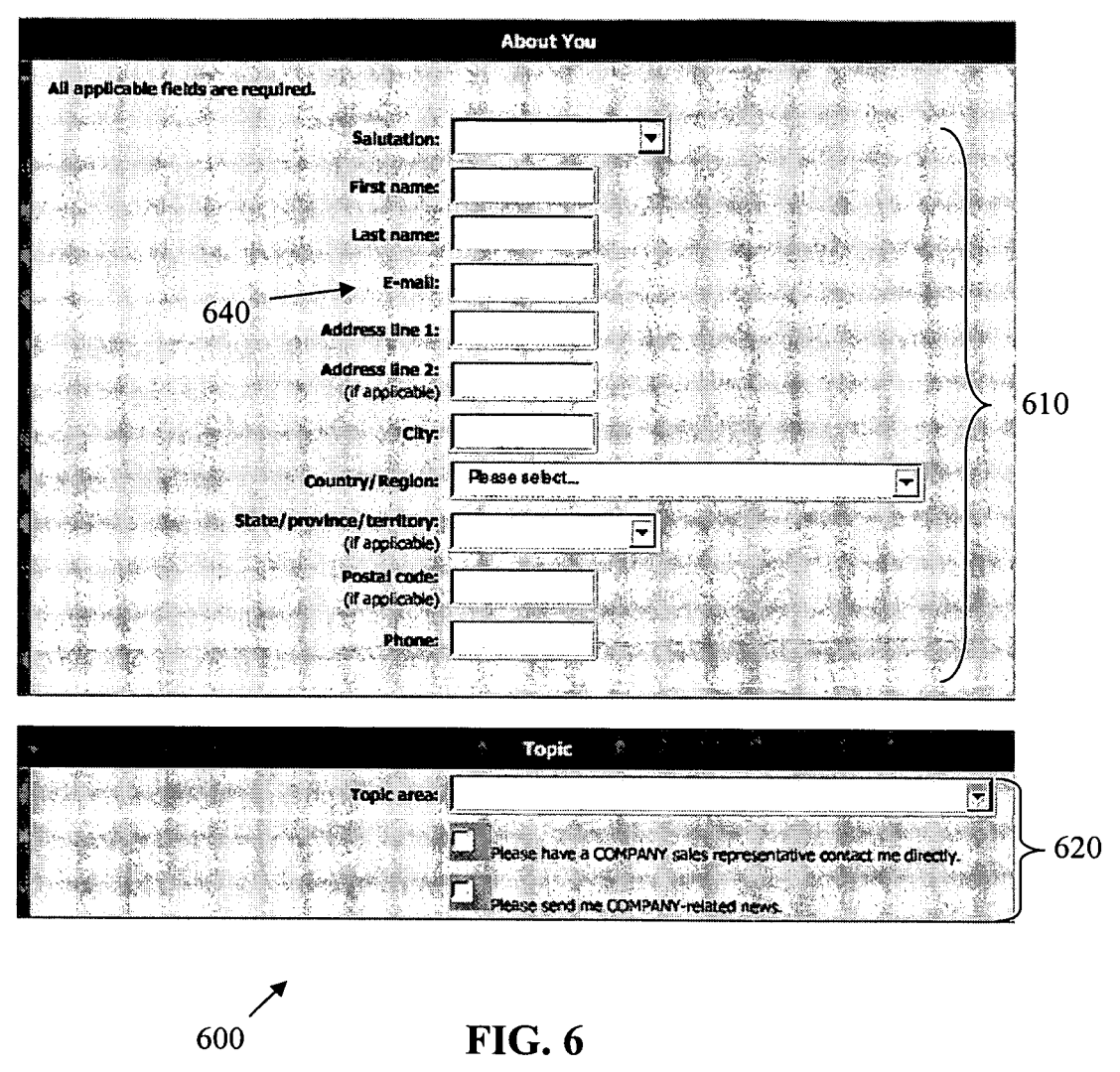

FIG. 6 illustrates a form 600 similar to form 500 but which includes two sections of input elements 610, 620. The first section 610 seeks contact information for a user. However, unlike section 510 in form 500, the first section 610 omits certain input elements Relationship to Company, Position, Industry. Moreover, an input element requesting that a user enter his or her e-mail address 640 is provided in a different location. Additionally, the second section 620 includes input elements seeking a user to categorize a topic for contacting a company are displayed. In contrast to form 500, form 600 does not include a section prompting a user to enter in a message to accompany the information in the other two sections.

With form 600, the determination of whether to omit certain input elements and/or to modify the position of input elements may be based on usage statistics associated with the form. The usage statistics may be based on metrics from a plurality of users, for users originating from a certain IP address, and/or for a single user. These metrics may be obtained by monitoring which input elements are used by previous users. For example, if most users forming the usage statistics enter in their salutation, first name, last name, and e-mail address, but omit certain other input elements, the e-mail address input element 630 may be elevated to a more prominent position within the first section 610 as compared to a default form (e.g., form 500). The usage statistics may also be utilized to determine whether to omit certain input elements and/or to omit certain sections with a form. For example, if the usage statistics may be used to rank the frequency in which each input element is utilized by a previous user or set of users. In some variations, the 15% least frequency utilized input elements may be omitted from rendering the form in the future and/or such input elements may be placed in a less prominent position. Other rankings, such as frequency of use of certain input elements by the company (as opposed to the frequency of entry by users) may be utilized when determining whether to modify an appearance of a form.

Figure 7:
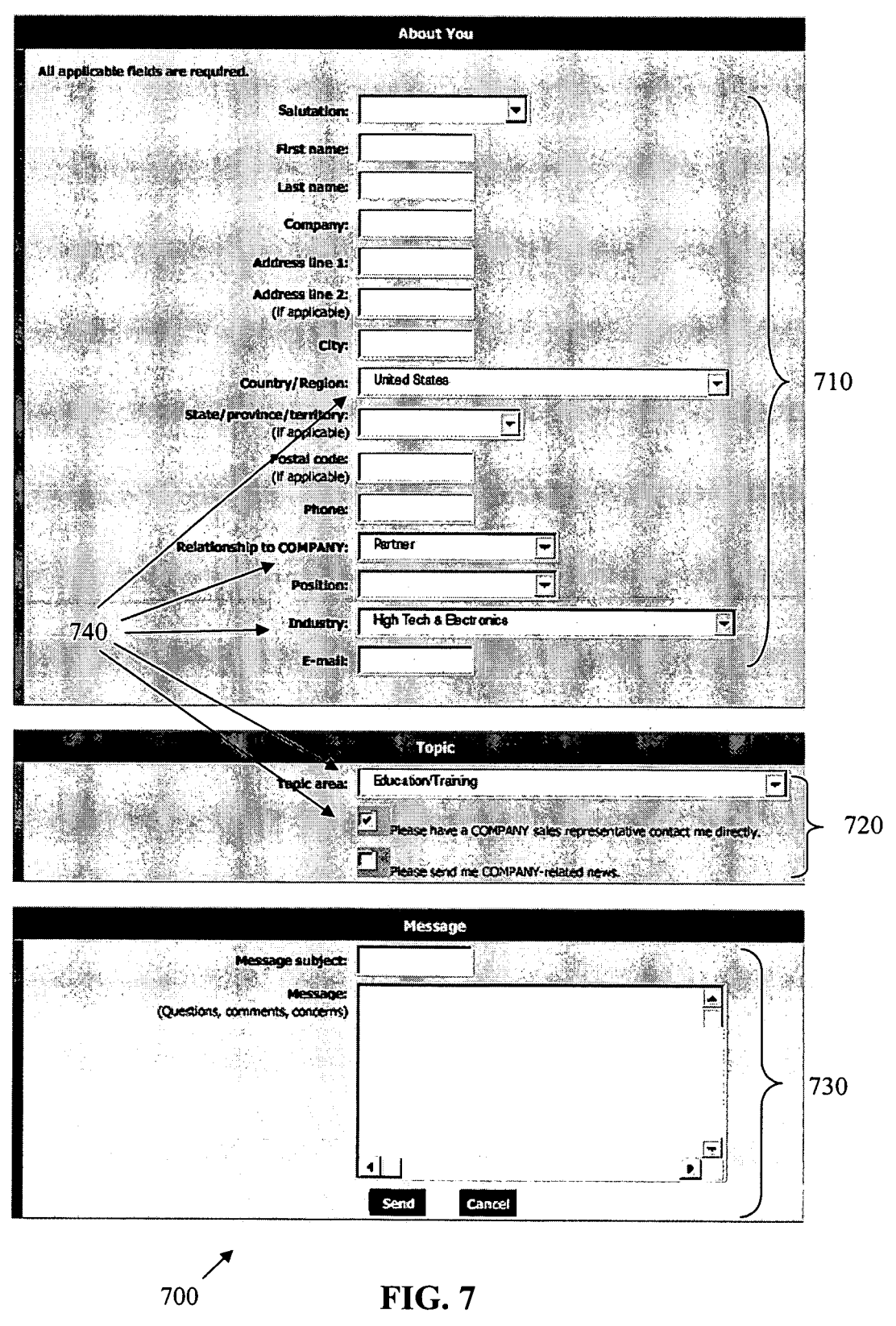

FIG. 7 illustrates a form 700 comprising three sections 710, 720, and 730 similar to sections 510, 520, and 530 of form 500. However, unlike form 500, form 700 comprises a plurality of pre-populated input elements 740 which are based, for example, on usage statistics (which may include predicted selection of input elements 740 as opposed to previous actual usage). Pre-populating input elements such as drop down menus, text entry input elements, Boolean selection operators, and the like can greatly reduce the amount of time required to enter in information prompted in the form 700.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer program product, tangibly embodied on non-transitory computer-readable storage media, the computer program product being operable to cause a data processing apparatus to:
   automatically identify, based on usage statistics for a form, a subset of a plurality of input elements associated with the form to be rendered in a graphical user interface, wherein the usage statistics are determined by monitoring previous uses of the form, and wherein the usage statistics are selected from a group comprising most frequently used input elements, most recently used input elements, and predicted use of input elements;
   initiate a rendering of the form in the graphical user interface to include the subset of the plurality of input elements and to exclude input elements that are not within the subset;
   modify, based on the usage statistics, a physical layout of at least one of the subset of the plurality of input elements, wherein the physical layout relates to a position on the form, and wherein the position is one of a more prominent position and a less prominent position on the form; and
   exclude at least one of the subset of the plurality of input elements within the form based on the usage statistics.

2. The computer program product as in claim 1, wherein the computer program product is further operable to cause a data processing apparatus to:
   rank the plurality of input elements based on frequency of use; and
   wherein the identifying is based on the ranking of the plurality of input elements.

3. The computer program product as in claim 1, wherein the computer program product is further operable to cause a data processing apparatus to:
   rank the plurality of input elements based on a predicted frequency of use; and
   wherein the identifying is based on the ranking of the plurality of input elements.

4. The computer program product as in claim 1, wherein the computer program product is further operable to cause a data processing apparatus to:
   rank the plurality of input elements based on a most recent usage; and
   wherein the identifying is based on the ranking of the plurality of input elements.

5. The computer program product as in claim 1, wherein the computer program product is further operable to cause a data processing apparatus to: populate at least one of the subset of the plurality of elements with a pre-determined value.

6. The computer program product as in claim 1, wherein the computer program product is further operable to cause a data processing apparatus to:
   receive data values input by the user into the subset of the plurality of input elements.

7. The computer program product as in claim 1, wherein the computer program product is further operable to cause a data processing apparatus to:
   not receive data values into the input elements that were excluded from the subset.

8. The computer program product as in claim 1, wherein the computer program product is further operable to cause a data processing apparatus to:
   receive data values input by the user into some of the subset of the plurality of input elements; and
   update the usage statistics according to a usage of some of the subset of the plurality of input elements.

9. The computer program product as in claim 1, wherein the computer program product is further operable to cause a data processing apparatus to:
   receive data values input by the user into some of the subset of the plurality of input elements; and
   update the usage statistics according to an absence of usage of others of the subset of the plurality of input elements.

10. The computer program product as in claim 1, wherein the computer program product is further operable to cause a data processing apparatus to:
    receive data values input by the user into some of the subset of the plurality of input elements; and
    update the usage statistics according to receiving the data values into some of the subset of the plurality of input elements.

11. A computer system, comprising:
    a memory that is configured to store one or more computer programs; and
    a processor, coupled to the memory, that is configured to execute the one or more computer programs to control the computer system to:
    automatically identify, based on usage statistics for a form, a subset of a plurality of input elements associated with the form to be rendered in a graphical user interface, wherein the usage statistics are determined by monitoring previous uses of the form, and wherein the usage statistics are selected from a group comprising most frequently used input elements, most recently used input elements, and predicted use of input elements, initiate a rendering of the form in the graphical user interface to include the subset of the plurality of input elements and to exclude input elements that are not within the subset modify, based on the usage statistics, a physical layout of at least one of the subset of the plurality of input elements, wherein the physical layout relates to a position on the form, and wherein the position is one of a more prominent position and a less prominent position on the form, and exclude at least one of the subset of the plurality of input elements within the form based on the usage statistics.

12. The computer system as in claim 11, wherein the one or more computer programs is further operable to control the computer system to:

monitor the usage statistics associated with the form; and store the monitored usage statistics in a data repository.

13. The computer system as in claim 11, wherein the one or more computer programs is further operable to control the computer system to: alter an appearance of at least one of the subset of the plurality of input elements within the form based on the usage statistics.

14. The computer system as in claim 11, wherein the computer program product is further operable to control the computer system to:

receive data values input by the user into some of the subset of the plurality of input elements; and update the usage statistics according to receiving the data values into some of the subset of the plurality of input elements.

15. A method of generating graphical user interfaces by a computer system, the method comprising:

automatically identifying, based on usage statistics for a form, a subset of a plurality of input elements associated with the form to be rendered in a graphical user interface implemented by the computer system, wherein the usage statistics are determined by the computer system monitoring previous uses of the form, and wherein the usage statistics are selected from a group comprising most frequently used input elements, most recently used input elements, and predicted use of input elements;

initiating a rendering of the form in the graphical user interface by the computer system to include the subset of the plurality of input elements and to exclude input elements that are not within the subset; and modify, based on the usage statistics, a physical layout of at least one of the subset of the plurality of input elements, wherein the physical layout relates to a position on the form, and wherein the position is one of a more prominent position and a less prominent position on the form; and exclude at least one of the subset of the plurality of input elements within the form based on the usage statistics.

16. The method of claim 15 further comprising ranking the plurality of input elements based on frequency of use, wherein the identifying is based on the ranking of the plurality of input elements.

17. The method of claim 16 wherein the frequency of use is a predicted frequency of use.

18. The method of claim 15 wherein generating graphical user interfaces further comprises ranking the plurality of input elements based on a most recent usage; and wherein the identifying is based on the ranking of the plurality of input elements.

19. The method of claim 15 further comprising:

generating the usage statistics for the form based on form generation requests from a plurality of clients over a network;

storing the usage statistics relating to the plurality of input elements to be used in rendering the form in a data repository;

receiving a form generation request from a client;

polling the data repository to obtain the usage statistics for the form;

utilizing the usage statistics to determine the subset of input elements to be rendered; and transmitting data to render the form using the subset of input elements to the requesting client.

* * * * *